(12) United States Patent
Bhagwat et al.

(10) Patent No.: US 10,795,575 B2
(45) Date of Patent: Oct. 6, 2020

(54) DYNAMICALLY REACTING TO EVENTS WITHIN A DATA STORAGE SYSTEM

(71) Applicant: International Business Machines Corporation, Armonk, NY (US)

(72) Inventors: Deepavali M. Bhagwat, Cupertino, CA (US); Marc A. Kaplan, Bethel, CT (US); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/476,783

(22) Filed: Mar. 31, 2017

(65) Prior Publication Data

US 2018/0285004 A1   Oct. 4, 2018

(51) Int. Cl.
*G06F 3/06* (2006.01)
*G06F 16/185* (2019.01)

(52) U.S. Cl.
CPC .......... *G06F 3/0604* (2013.01); *G06F 3/0649* (2013.01); *G06F 3/0665* (2013.01); *G06F 3/0685* (2013.01); *G06F 16/185* (2019.01)

(58) Field of Classification Search
CPC .... G06F 3/0629; G06F 3/0604; G06F 3/0653; G06F 3/0673; G06F 3/064; G06F 3/0643; G06F 3/067; G06F 17/30082; G06F 17/30091; G06F 3/0685; G06F 3/0665; G06F 3/0649; G06F 16/185
See application file for complete search history.

(56) References Cited

U.S. PATENT DOCUMENTS

| | | | |
|---|---|---|---|
| 6,366,926 B1 | 4/2002 | Pohlmann et al. | |
| 6,446,136 B1 | 9/2002 | Pohlmann et al. | |
| 8,117,396 B1 | 2/2012 | Fair et al. | |
| 8,352,685 B2 | 1/2013 | Bannon et al. | |
| 9,286,261 B1 | 3/2016 | Tzelnic et al. | |
| 9,298,733 B1 | 3/2016 | Faibish et al. | |
| 9,354,922 B2 | 5/2016 | Lee | |
| 9,424,263 B1 | 8/2016 | Aston et al. | |
| 9,454,331 B1 | 9/2016 | Bent et al. | |
| 9,910,742 B1 | 3/2018 | Faibish et al. | |
| 2003/0031260 A1* | 2/2003 | Tabatabai | H04N 21/234318 375/240.25 |
| 2004/0123145 A1* | 6/2004 | Baffes | H04L 63/1416 726/1 |
| 2005/0262097 A1 | 11/2005 | Sim-Tang et al. | |
| 2006/0259527 A1* | 11/2006 | Devarakonda | G06F 16/13 |
| 2008/0077633 A1* | 3/2008 | Kaplan | G06F 16/122 |

(Continued)

FOREIGN PATENT DOCUMENTS

CN   104424234 A   3/2015

OTHER PUBLICATIONS

Bhagwat et al., U.S. Appl. No. 15/475,012, filed Mar. 30, 2017.
(Continued)

*Primary Examiner* — Michael Krofcheck
(74) *Attorney, Agent, or Firm* — Zilka-Kotab, P.C.

(57) ABSTRACT

A computer-implemented method according to one embodiment includes identifying an event associated with data stored in a data storage system, determining a policy rule that is triggered in response to the event, and implementing one or more actions according to the policy rule.

22 Claims, 11 Drawing Sheets

(56) References Cited

U.S. PATENT DOCUMENTS

| | | | |
|---|---|---|---|
| 2011/0173251 A1* | 7/2011 | Sandhu | G06F 8/61 709/203 |
| 2011/0231631 A1 | 9/2011 | Matsuzawa et al. | |
| 2011/0246491 A1* | 10/2011 | Clash | G06F 3/065 707/755 |
| 2011/0252434 A1 | 10/2011 | Stokes | |
| 2012/0023146 A1 | 1/2012 | Shoji et al. | |
| 2012/0047332 A1 | 2/2012 | Bannon et al. | |
| 2012/0331135 A1* | 12/2012 | Alon | H04L 41/044 709/224 |
| 2012/0331394 A1* | 12/2012 | Trombley-Shapiro | H04L 67/06 715/748 |
| 2013/0019171 A1* | 1/2013 | Mounty | G06F 11/3688 715/704 |
| 2013/0103906 A1 | 4/2013 | Bannon et al. | |
| 2013/0282720 A1* | 10/2013 | Baker | G06F 17/30705 707/737 |
| 2014/0351300 A1 | 11/2014 | Uppu et al. | |
| 2015/0106578 A1* | 4/2015 | Warfield | G06F 3/0613 711/158 |
| 2017/0004050 A1 | 1/2017 | James et al. | |
| 2017/0068451 A1 | 3/2017 | Kenan et al. | |
| 2017/0214738 A1* | 7/2017 | Agarwal | H04L 67/1002 |
| 2018/0041525 A1* | 2/2018 | Elgressy | H04L 63/1416 |
| 2018/0285370 A1 | 10/2018 | Bhagwat et al. | |

OTHER PUBLICATIONS

List of IBM Patents or Patent Applications Treated as Related.

Teng et al., "TRIO: Burst Buffer Based I/O Orchestration," IEEE International Conference on Cluster Computing, 2015, pp. 194-203.

Wan et al., "Optimizing Checkpoint Data Placement with Guaranteed Burst Buffer Endurance in Large-Scale Hierarchical Storage Systems," Journal of Parallel and Distributed Computing 100, 2017, pp. 16-29.

Romanus et al., "Challenges and Considerations for Utilizing Burst Buffers in High-Performance Computing," arXiv reprint arXiv:1509.05492, 2015, pp. 1-19.

NIST Cloud Computing Program, Dec. 9, 2013, pp. 1-2, Retrieved From http://www.nist.gov/itl/cloud/.

Mell et al., "Definition of Cloud Computing," National Institute of Standards and Technology, Information Technology Laboratory, Version 15, 2009, pp. 1-2.

Mell et al., "Definition of Cloud Computing," NIST Special Publication 800-145, 2001, pp. 1-7.

IBM, "IBM Spectrum Scale," Feb. 16, 2017, pp. 1-3, Retrieved From http://www-03.ibm.com/systems/storage/spectrum/scale/.

Wikipedia, "Virtual File System," Jan. 2, 2017, pp. 1-4, Retrieved From https://en.wikipedia.org/wiki/Virtual_file_system.

Wikipedia, "inotify," Jan. 24, 2017, pp. 1-2, Retrieved From https://en.wikipedia.org/wiki/Inotify.

Linux Programmer's Manual, "Fanotify," Mar. 15, 2016, pp. 1-10, Retrieved From http://man7.org/linux/man-pages/man7/fanotify.7.html.

Microsoft, "Obtaining Directory Change Notifications," Jan. 27, 2017, pp. 1-4, Retrieved From https://msdn.microsoft.com/en-us/library/windows/desktop/aa365261(v=vs.85).aspx.

Amazon Web Services, "Configuring Amazon S3 Event Notifications," Oct. 18, 2016, pp. 1-10, Retrieved From http://docs.aws.amazon.com/AmazonS3/latest/dev/NotificationHowTo.html.

Wikipedia, "DMAPI," Aug. 19, 2014, pp. 1, Retrieved From https://en.wikipedia.org/wiki/DMAPI.

Netapp, "What FPolicy is," Feb. 2014, pp. 1-2, Retrieved From https://library.netapp.com/ecmdocs/ECMP1401220/html/GUID-54FE1A84-6CF0-447E-9AAE-F43B61CA2138.html.

Non-Final Office Action from U.S. Appl. No. 15/475,012, dated Jul. 11, 2019.

Final Office Action from U.S. Appl. No. 15/475,012, dated Jan. 8, 2020.

Advisory Action from U.S. Appl. No. 15/475,012, dated Mar. 11, 2020.

* cited by examiner

502: Identify an event associated with data stored in a data storage system

504: Determine a policy rule that is triggered in response to the event

506: Implement one or more actions according to the policy rule

602: Receive a policy rule input by a user

604: Tag the policy rule with a name indicating a type of event to which the policy rule applies 606: Persistently store the policy rule in an ordered list of policy rules that is evaluated at each junction in a data path of the data storage system

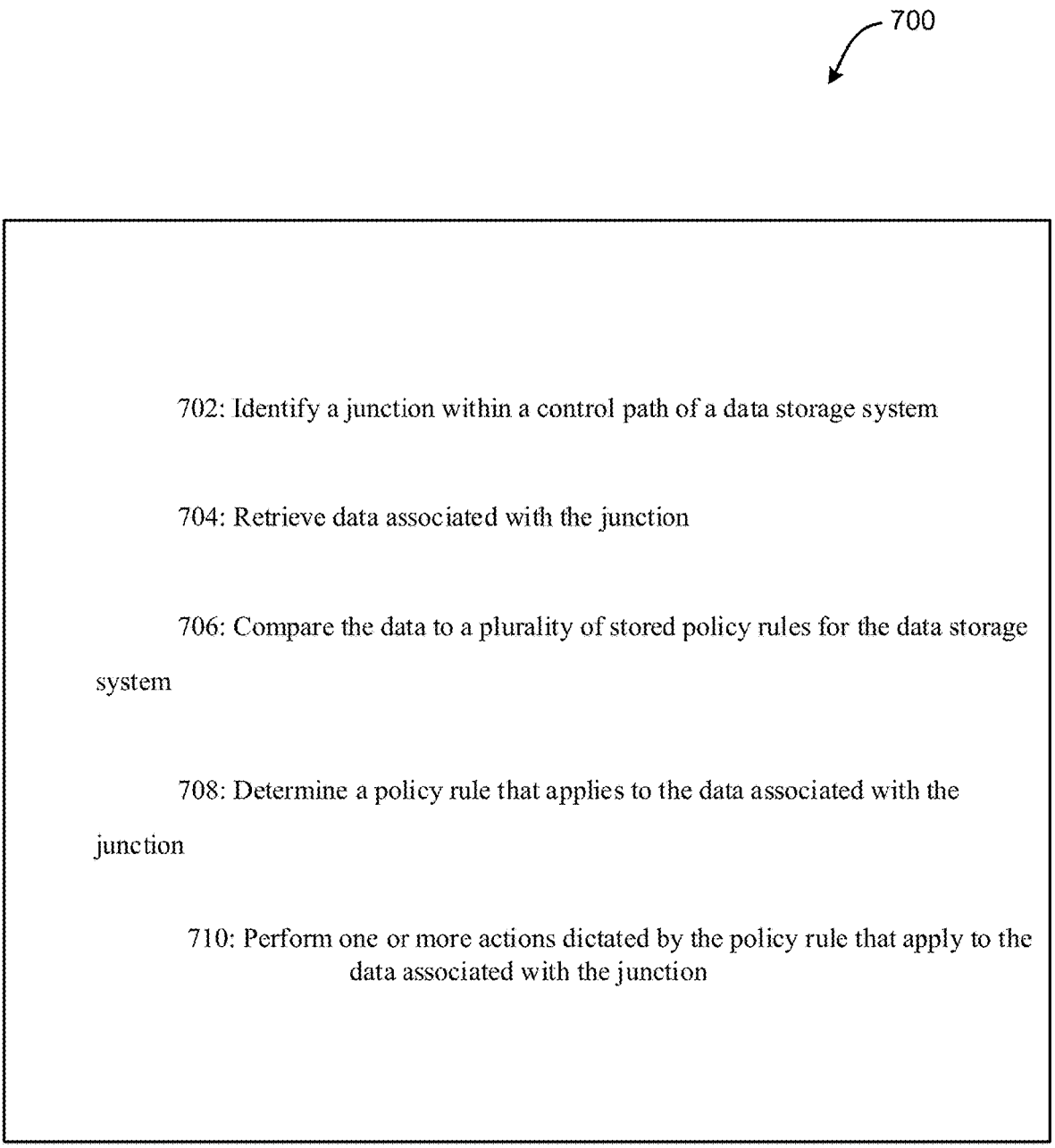

700

702: Identify a junction within a control path of a data storage system

704: Retrieve data associated with the junction

706: Compare the data to a plurality of stored policy rules for the data storage system 708: Determine a policy rule that applies to the data associated with the junction 710: Perform one or more actions dictated by the policy rule that apply to the data associated with the junction

802: Identify an event associated with a storage tier of a data storage system

804: Determine a policy rule that is triggered in response to the event

806: Implement one or more data management actions associated with the storage tier according to the policy rule

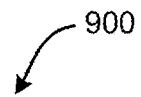

902: Identify a file event on a file within a data storage system, where data associated with the file is stored in a first storage tier of the data storage system 904: Compare the file event to a plurality of stored policy rules for the data storage system to identify a policy rule that is triggered by the file event 906: Destage the file utilizing the policy rule that is triggered by moving data associated with the file from the first storage tier of the data storage system to a second storage tier of the data storage system

FIG. 9

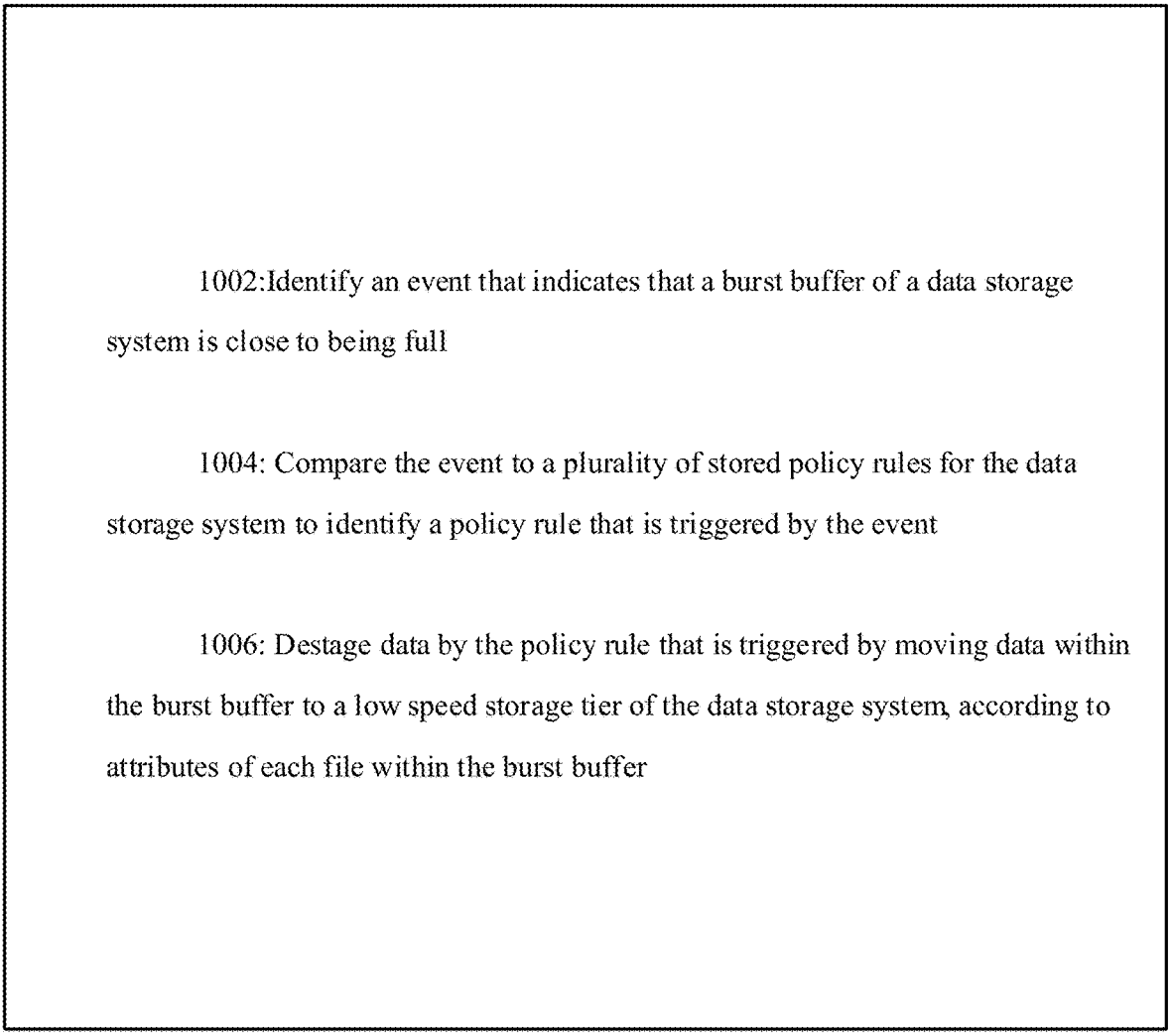

1002: Identify an event that indicates that a burst buffer of a data storage system is close to being full 1004: Compare the event to a plurality of stored policy rules for the data storage system to identify a policy rule that is triggered by the event 1006: Destage data by the policy rule that is triggered by moving data within the burst buffer to a low speed storage tier of the data storage system, according to attributes of each file within the burst buffer

1102: Identify an event that indicates that a new file is being brought into a burst buffer of the data storage system 1104: Compare the event to a plurality of stored policy rules for the data storage system to identify a policy rule that is triggered by the event 1106: Determine details for the file using ownership or access credentials or other file attributes, and log the details for the file in a reserved metadata file written to non-volatile media, according to the policy rule that is triggered

FIG. 11

DYNAMICALLY REACTING TO EVENTS WITHIN A DATA STORAGE SYSTEM

BACKGROUND

The present invention relates to data storage, and more specifically, this invention relates to dynamically responding to events occurring within a data storage system.

A storage system is a commonly used component of an enterprise's storage stack. Some components may exist above it, such as content managers and schedulers, and some components function below it, such as block, tape or archival storage. The storage system presents a consistent image of data to the layers above it. The storage system also provides a common data repository regardless of how the data is accessed, be it a file, object, database, etc.

Information associated with data stored within the storage system is of great value to other components, such as components above the storage system. However, current storage systems are unable to identify, report, and react to data-driven events occurring within the data storage system.

SUMMARY

A computer-implemented method according to one embodiment includes identifying an event associated with data stored in a data storage system, determining a policy rule that is triggered in response to the event, and implementing one or more actions according to the policy rule.

According to another embodiment, a computer program product for dynamically reacting to events within a data storage system comprises a computer readable storage medium having program instructions embodied therewith, wherein the computer readable storage medium is not a transitory signal per se, and where the program instructions are executable by a processor to cause the processor to perform a method comprising identifying an event associated with data stored in the data storage system, utilizing the processor, determining a policy rule that is triggered in response to the event, utilizing the processor, and implementing one or more actions according to the policy rule, utilizing the processor.

A system according to another embodiment includes a processor, and logic integrated with the processor, executable by the processor, or integrated with and executable by the processor, the logic being configured to identify an event associated with data stored in a data storage system, determine a policy rule that is triggered in response to the event, and implement one or more actions according to the policy rule.

A computer-implemented method according to one embodiment includes receiving, at a data storage system, a policy rule input by a user, tagging, at the data storage system, the policy rule with a name indicating a type of event to which the policy rule applies, and persistently storing the policy rule in an ordered list of policy rules that is evaluated at each junction in a data path of the data storage system.

A computer-implemented method according to one embodiment includes identifying a junction within a control path of a data storage system, retrieving data associated with the junction, comparing the data to a plurality of stored policy rules for the data storage system, determining a policy rule that applies to the data associated with the junction, and performing one or more actions dictated by the policy rule that apply to the data associated with the junction.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 illustrates a flowchart of a method for triggering and implementing a policy rule within a data storage system, in accordance with one embodiment.

FIG. 9 illustrates a flowchart of a method for dynamically managing a file event on a file, in accordance with one embodiment.

FIG. 10 illustrates a flowchart of a method for dynamically managing a burst buffer, in accordance with one embodiment.

FIG. 11 illustrates a flowchart of a method for adding a file to a burst buffer, in accordance with one embodiment.

DETAILED DESCRIPTION

Figure 1:
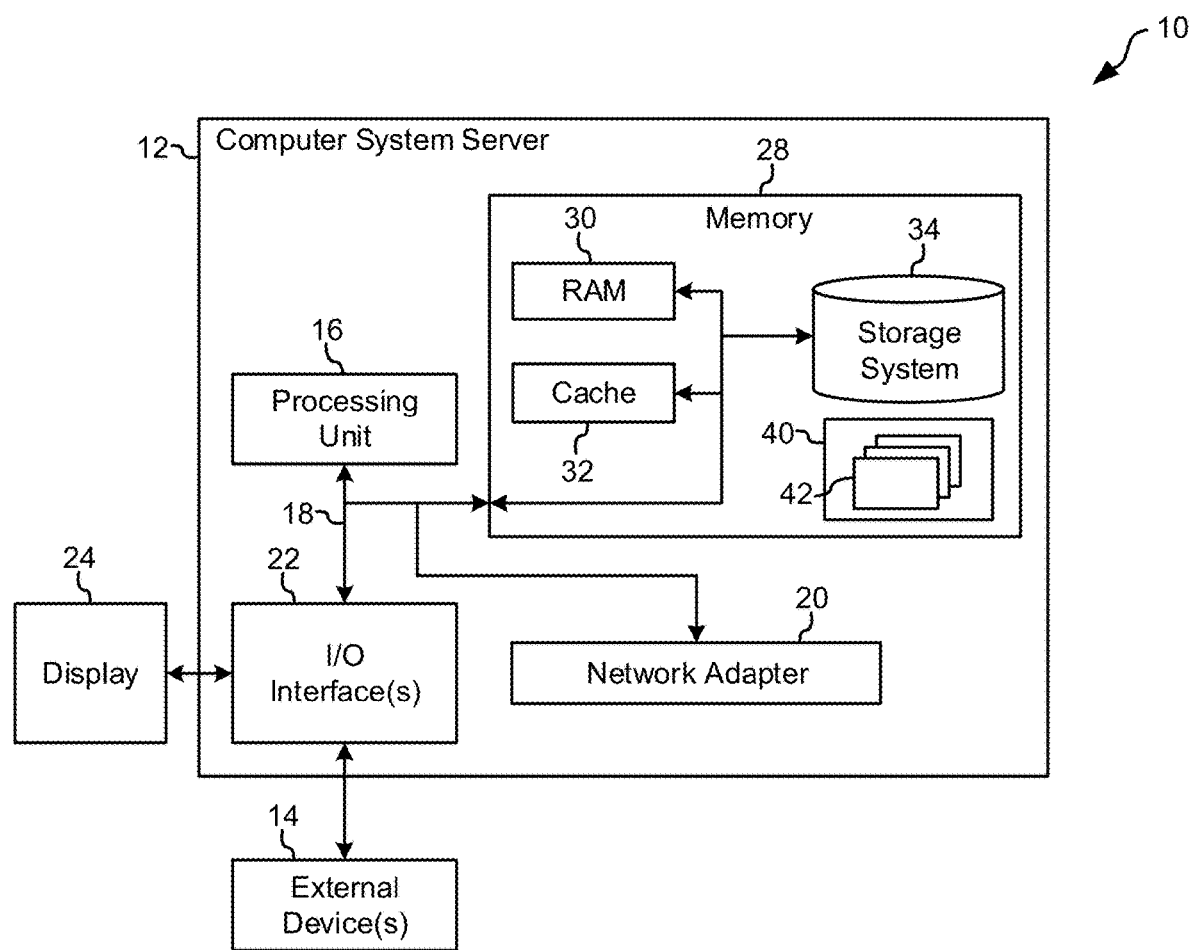
FIG. 1 depicts a cloud computing node according to an embodiment of the present invention.

The following description discloses several preferred embodiments of systems, methods and computer program products for dynamically reacting to events within a data storage system. Various embodiments provide a method for identifying a storage system event, identifying a policy rule that applies to the storage system event, and performing actions based on the policy rule.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically reacting to events within a data storage system.

In one general embodiment, a computer-implemented method includes identifying an event associated with data stored in a data storage system, determining a policy rule that is triggered in response to the event, and implementing one or more actions according to the policy rule.

In another general embodiment, a computer program product for dynamically reacting to events within a data storage system comprises a computer readable storage medium having program instructions embodied therewith, wherein the computer readable storage medium is not a transitory signal per se, and where the program instructions are executable by a processor to cause the processor to perform a method comprising identifying an event associated with data stored in the data storage system, utilizing the processor, determining a policy rule that is triggered in response to the event, utilizing the processor, and implementing one or more actions according to the policy rule, utilizing the processor.

In another general embodiment, a system includes a processor, and logic integrated with the processor, executable by the processor, or integrated with and executable by the processor, the logic being configured to identify an event associated with data stored in a data storage system, determine a policy rule that is triggered in response to the event, and implement one or more actions according to the policy rule.

In another general embodiment, a computer-implemented method includes receiving, at a data storage system, a policy rule input by a user, tagging, at the data storage system, the policy rule with a name indicating a type of event to which the policy rule applies, and persistently storing the policy rule in an ordered list of policy rules that is evaluated at each junction in a data path of the data storage system.

In another general embodiment, a computer-implemented method includes identifying a junction within a control path of a data storage system, retrieving data associated with the junction, comparing the data to a plurality of stored policy rules for the data storage system, determining a policy rule that applies to the data associated with the junction, and performing one or more actions dictated by the policy rule that apply to the data associated with the junction.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
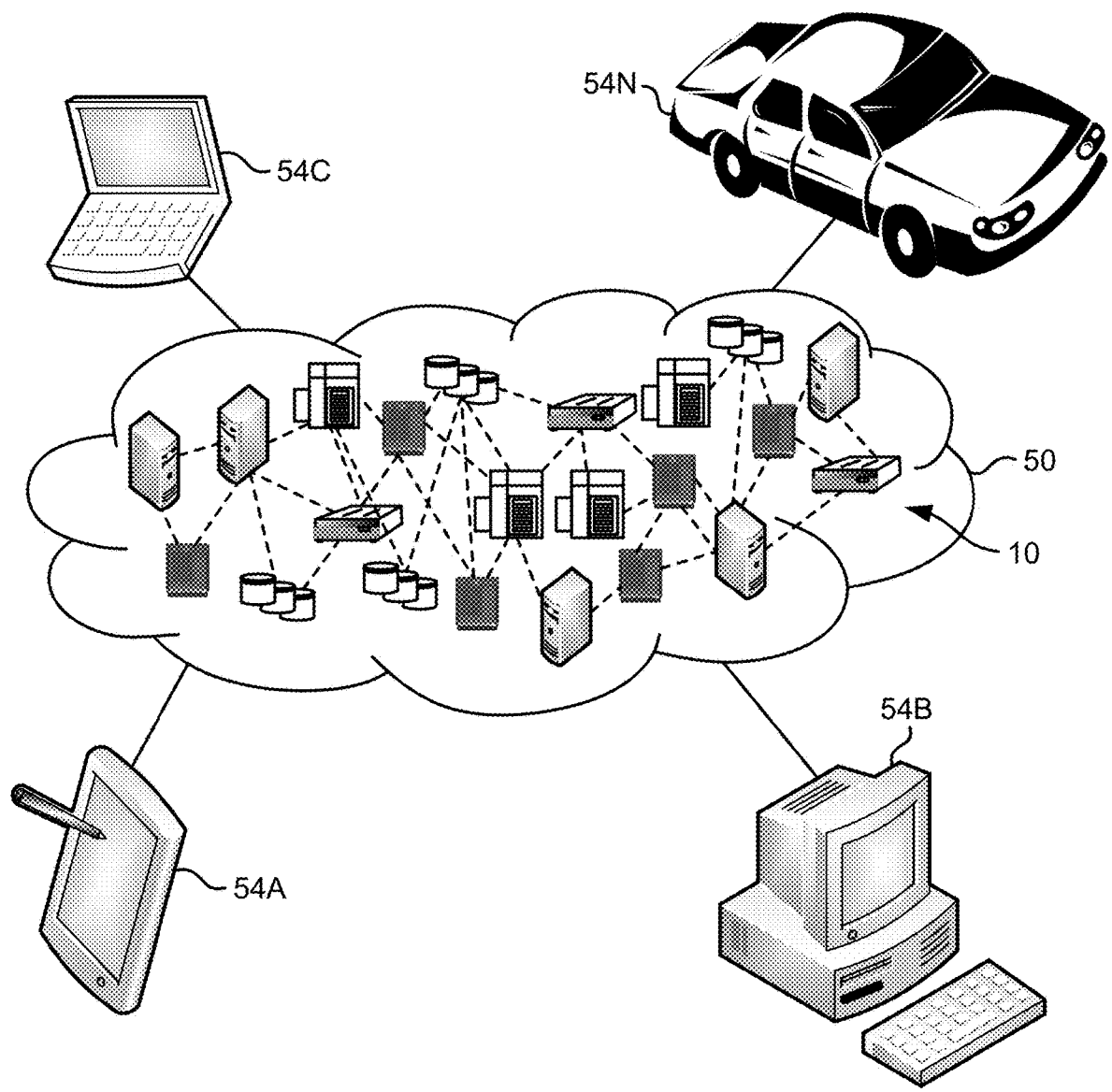
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
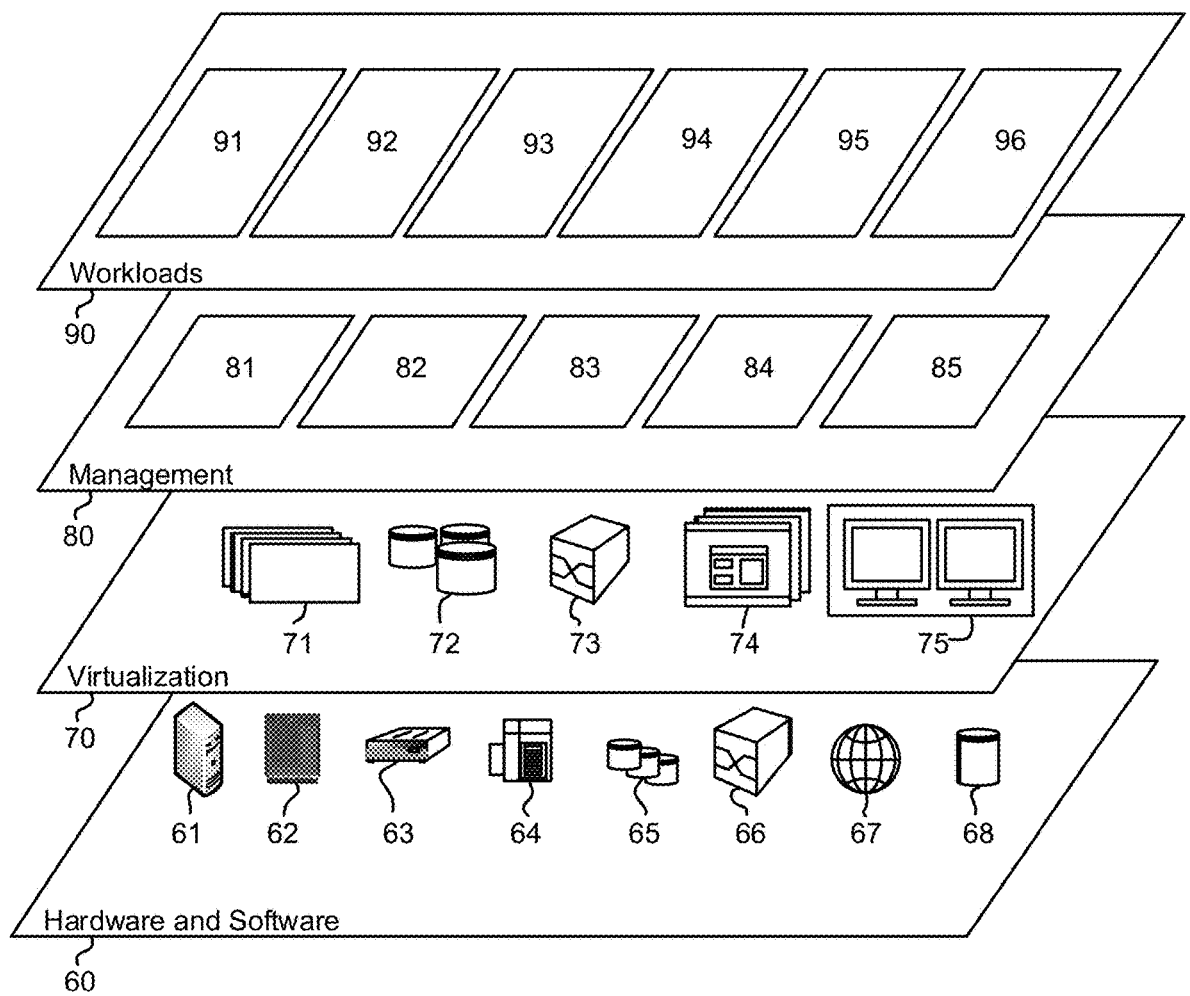
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
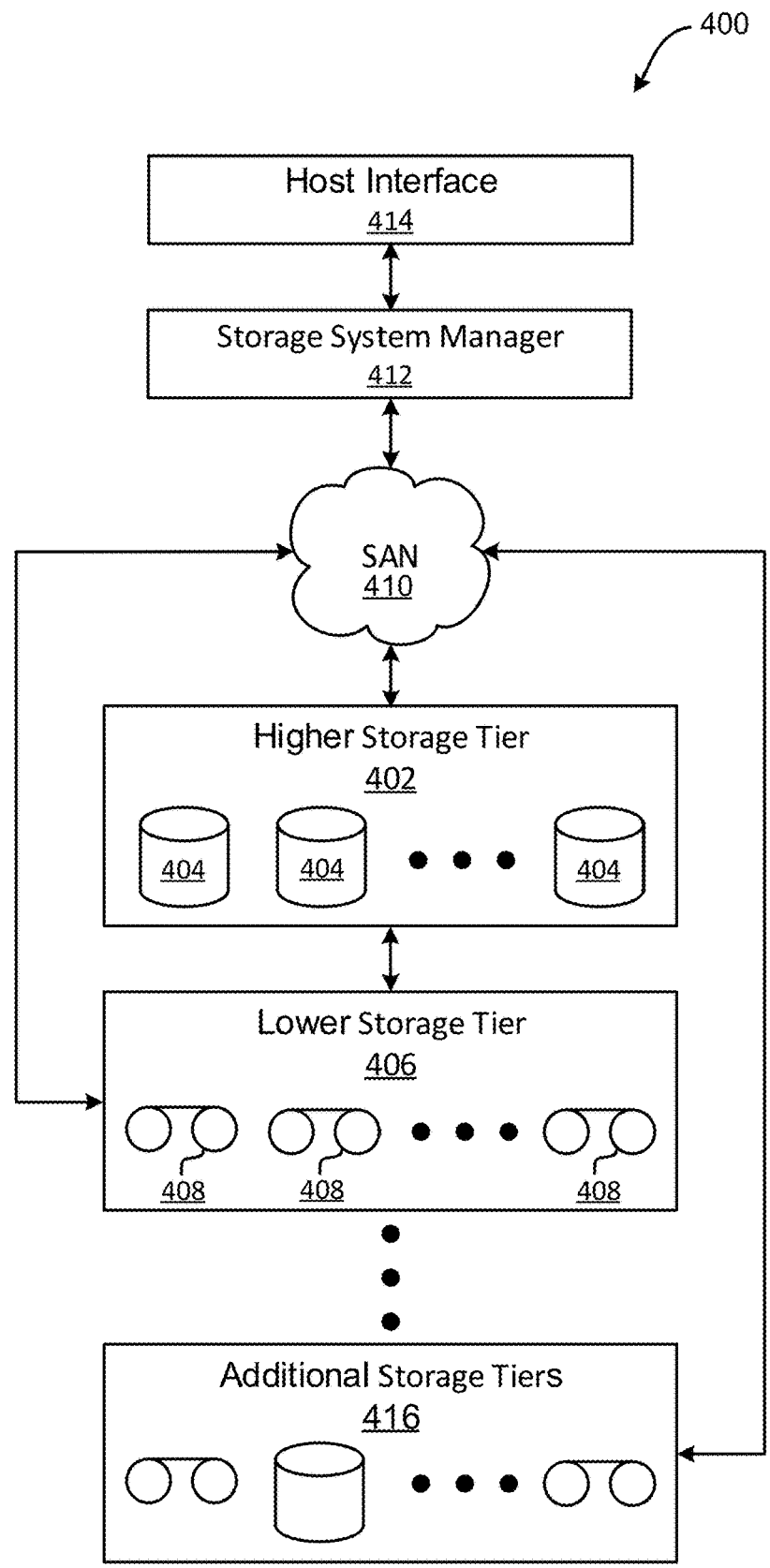
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
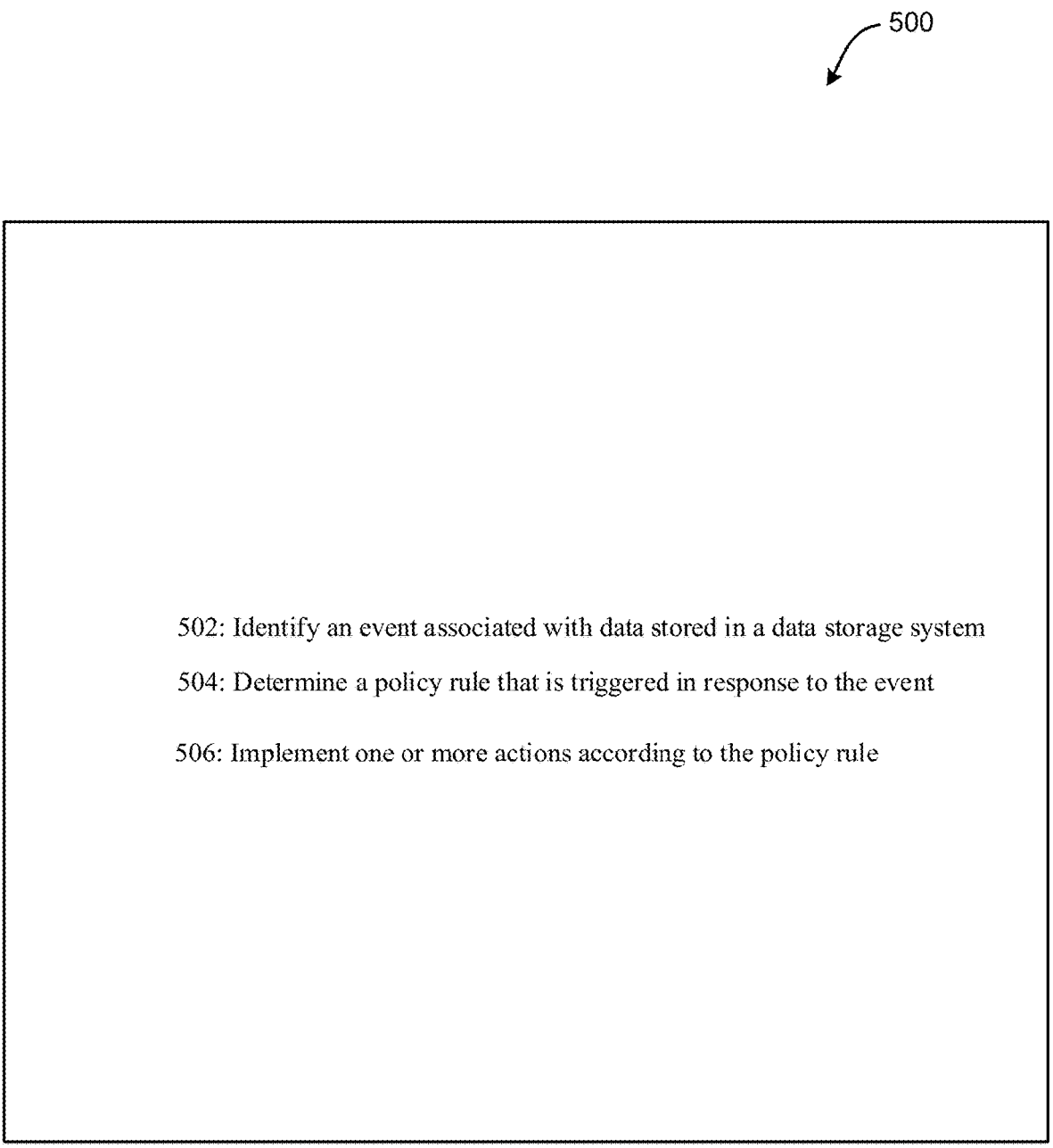
FIG. 5 illustrates a flowchart of a method for dynamically reacting to events within a data storage system, in accordance with one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an event associated with data stored in a data storage system is identified. In one embodiment, the event may include a junction in a data path of the data storage system. For example, the event may include one or more of the opening, closing, creation, destruction, moving, renaming, etc. of a predetermined file and/or object within the data storage system. In another example, the event may include a changing of one or more attributes (e.g., ownership, access controls, etc.) of a file, a changing of extended attributes for the file, etc.

Additionally, in one embodiment, the event may include a junction in a control path of the data storage system. For example, the event may include the moving of one or more predetermined files to rebalance storage space. In another example, the event may include an addition of one or more new disks to the data storage system. In yet another example, the event may include the moving of one or more predetermined files between storage tiers as files age/need to be cached within the data storage system.

Further, in one embodiment, the event may include a junction associated with a hardware environment of the data storage system. For example, the event may include an instance where the data storage system administers and/or manages underlying hardware within the data storage system (e.g., as it responds to one or more environmental factors, etc.). In another example, the event may include a turning off or on one or more disks within the data storage system due to a temperature increase/decrease within a data center. In yet another example, the event may include a disk failure within a data center associated with the data storage system.

Further still, in one embodiment, the event may be identified utilizing one or more hooks. For example, one or more hooks implemented within the data storage system may intercept one or more of function calls, messages, and events passed between software components within the data storage system. In another example, the information retrieved from one or more hooks may be analyzed in order to identify the event.

Also, in one embodiment, the data storage system may include a system that implements a computer data storage architecture. For example, the data storage system may include a distributed and/or clustered file system (e.g., a clustered file system that includes a shared file system mounted on a plurality of servers, etc.). In another embodiment, the event may be identified utilizing a hardware framework within the data storage system (e.g., where the framework includes one or more hardware processors, etc.).

Further still, method 500 may proceed with operation 504, where a policy rule is determined that is triggered in response to the event. In one embodiment, determining the policy rule may include comparing a plurality of policy rules to the event to determine a match. For example, each of a plurality of policy rules may be compared to the event in order to find a policy rule condition that evaluates to "true." In another example, the match may include an event specified by the policy rule that triggers the policy rule.

Furthermore, in one embodiment, the policy rules may be written in a high level language (e.g., structured query language (SQL), etc.). In another embodiment, each of the policy rules may include a triggering event, and one or more actions to be implemented in response to the triggering event. In yet another embodiment, the policy rules may be implemented as part of a policy rules subsystem within the data storage system.

Further still, in one embodiment, the policy rules may be persistent (e.g., non-volatile, able to be accessed after end of process that created them, etc.). For example, the policy rules may be reloaded into the data storage system each time a file system is mounted for the data storage system. In another embodiment, the policy rules may apply to all nodes within a cluster within the data storage system. In yet another embodiment, the policy rules may be associated with specific predetermined data within the data storage system. For example, the policy rules may be associated with a subtree of data within the data storage system, one or more specific files, ranges of data within one or more files, etc. within the data storage system.

Also, in one embodiment, determining the policy rule may include identifying metadata associated with the event. For example, the metadata may include one or more file attributes of the data (e.g., a file name, path, file size, offset, inode number, etc.). In another example, the metadata may include one or more attributes of one or more users associated with the event (e.g., a user ID of a user who initiated the event, etc.).

In yet another example, the metadata may include one or more characteristics of the event. For example, the metadata may include a time of the event, which process initiated the event, etc. In another example, when the event includes a movement of data, the metadata may include source and target storage tier names. In yet another example, the metadata may include an identification of one or more components of the data storage system (e.g., an identification of racks within a data center of a data storage system, etc.). In still another example, the metadata may include an indication of data read, written, and/or altered during the event.

Additionally, in one embodiment, the policy rules may be compared to the metadata in order to determine a match. In another embodiment, the policy rule may be determined utilizing a hardware framework within the data storage system (e.g., where the framework includes one or more hardware processors, etc.).

In addition, method 500 may proceed with operation 506, where one or more actions are implemented, according to the policy rule. In one embodiment, the one or more actions may include an initiation of an external process (e.g., an application, etc.). For example, the one or more actions may be implemented utilizing one or more processing threads within the data storage system. In another example, the external process may include an analytical workflow, an antivirus scan, etc.

Further still, in one embodiment, the one or more actions may include running one or more internal subroutines within the data storage system. For example, the one or more subroutines may set a state on one or more files within the data storage system or internal data of the data storage system. In another example, the one or more subroutines may initiate one or more checkpoints, snapshots, etc.

In yet another example, the one or more subroutines may manipulate data within the data storage system. For instance, the one or more subroutines may move data to a new location (e.g., a new tier) within a storage hierarchy of the data storage system. In another instance, the one or more subroutines may change a state of one or more files within the data storage system.

Also, in one embodiment, the one or more actions may include enqueueing an event onto an external queue. In another embodiment, the one or more actions may include logging the event (e.g., storing the event in a log or message queue, etc.). In yet another embodiment, the one or more actions may include a sending of a notification to one or more users. For example, the contents of the notification may be dictated by the policy rule.

In addition, in one embodiment, the one or more actions may include changing an internal state of the data storage system. In another embodiment, the one or more actions may include retrieving metadata associated with the event. For example, the metadata may be reported, utilized in implementing the one or more actions, etc.

Furthermore, in one embodiment, the one or more actions may be performed synchronously or asynchronously. For example, the synchronous actions may hold a thread that calls the one or more actions until the event completes. In this way, the thread may be intercepted and failed if desired. For example, the one or more actions may include intercepting and failing the event. In another example, the asynchronous actions may be performed at any time during the implementation or after the completion of the event. In another embodiment, the one or more actions may be implemented utilizing a hardware framework within the data storage system (e.g., where the framework includes one or more hardware processors, etc.).

In this way, the functionality of the data storage system may be easily, flexibly, and safely augmented in response to events as they occur. The data storage system may also interact with a wide variety of external data managers that provide various functionality such as auditing, billing, access control, intrusion detection, hierarchical storage management, tiering, data distribution, etc.

Figure 6:
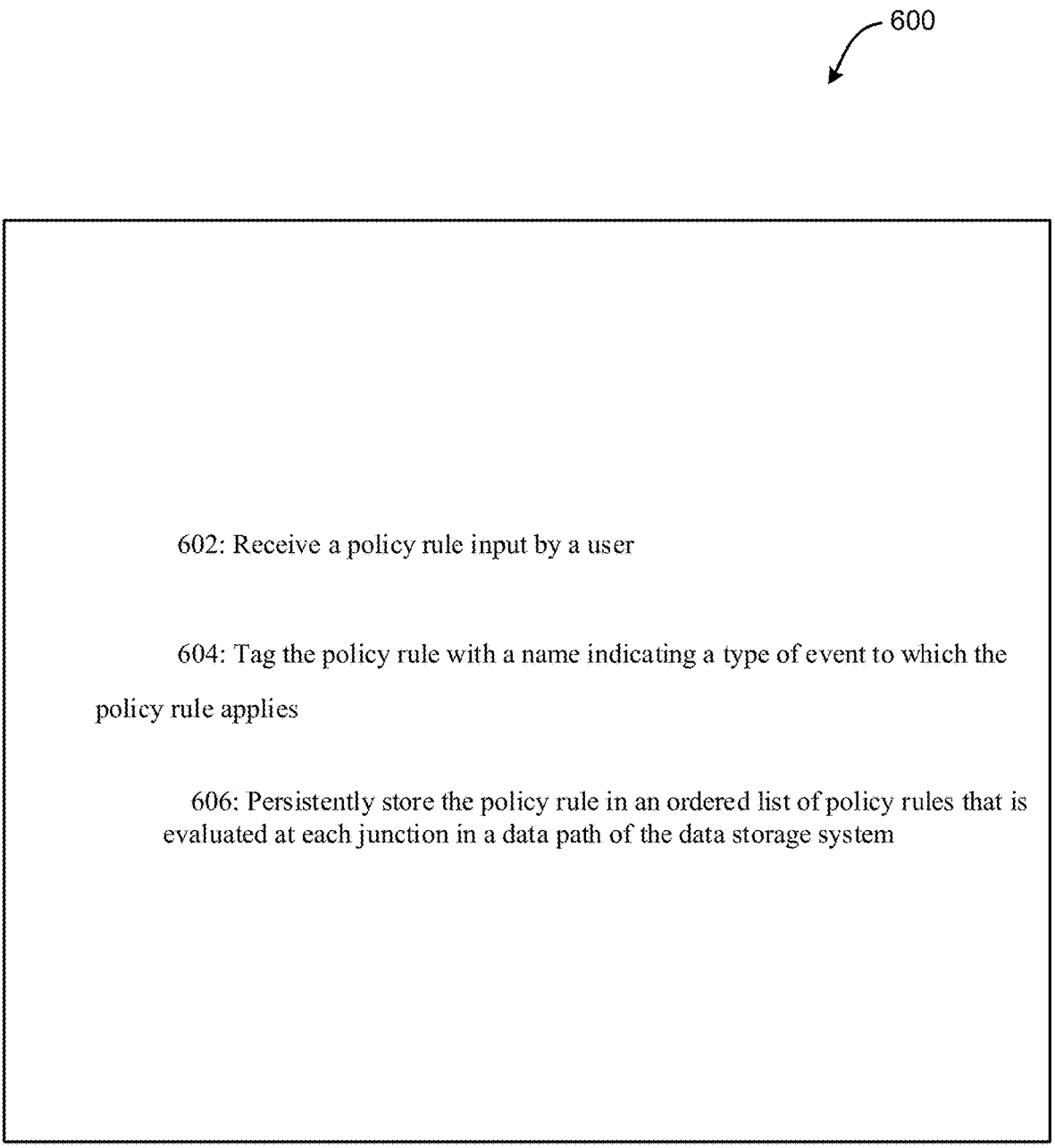
FIG. 6 illustrates a flowchart of a method for creating and storing a policy rule within a data storage system, in accordance with one embodiment.

Now referring to FIG. 6, a flowchart of a method 600 for creating and storing a policy rule within a data storage system is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a policy rule input by a user is received. In one embodiment, the policy rule may be input utilizing a high level language. For example, the policy rule may include one or more SQL expressions. In another embodiment, the policy rule may specify an event occurring within an entirety of the data storage system. For example, the event may be specified utilizing a "where" clause within the policy rule.

Additionally, in one embodiment, the policy rule may reference one or more properties and/or attributes of a file within a data storage system. For example, the properties and/or attributes may be stored as metadata in associated with the file within the data storage system. In another example, the properties and/or attributes may include one or more of a file name, file path, file size, file offset, file range, file set name, user ID, group ID, storage pool name, extended attributes of the file, inode number, modification time, current time, caller ID, etc.

Further, in one embodiment, the policy rule may include an array of values representative of a file within the data storage system. For example, the policy rule may include one or more variables indicating data within a file, an offset of the data within the file, a length of the data within the file, etc. In another embodiment, the policy rule may include an identification of one or more predetermined properties and/or attributes of the file within a data storage system.

Further still, in one embodiment, the policy rule may include a dependency on one or more actions (e.g., contents of a file and/or data being read or written by a predetermined operation within the data storage system, etc.). In another example, the policy rule may include one or more variables identifying data being read, written, etc. In yet another example, the policy rule may include an identification of an occurrence of the one or more actions.

Also, in one embodiment, the policy rule may specify an action to be executed in response to an occurrence of the event. For example, the action may include an invocation of an external process or command. In another example, the action may include an invocation of a remote procedure call, where the procedure call may be synchronous or asynchronous. In another example, the action may include storing an annotation of the event. For example, the annotated event may capture a method of invocation of a process that performed an action, and the annotated event may be stored in a log or message queue.

In addition, in one embodiment, the policy rule may include one or more transactional semantics for the data storage system. For example, the transactional semantics may specify that if an action to be executed fails, either the event completes and is logged, or the event does not complete and is not logged.

Furthermore, method 600 may proceed with operation 604, where the policy rule is tagged with a name indicating a type of event to which the policy rule applies. Further still, method 600 may proceed with operation 606, where the policy rule is persistently stored in an ordered list of policy rules that is evaluated at each junction in the data path of the data storage system. For example, the policy rules may be stored persistently and may be reloaded each time the file system is mounted.

In this way, a user may implement a set of policy rules to specify events of interest, as well as actions to be executed in response to those events Now referring to FIG. 7, a flowchart of a method 700 for triggering and implementing a policy rule within a data storage system is shown, according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a junction within a control path of a data storage system is identified. In one embodiment, the junction may be identified utilizing a hook within the control path. In another embodiment, the junction may indicate an event occurring within the data storage system.

Additionally, method 700 may proceed with operation 704, where data associated with the junction is retrieved. In one embodiment, the data may include environment attributes. For example, the data may include data describing one or more actions being performed. In another embodiment, the data may include a plurality of file attributes. For example, the data may include metadata describing files within the data storage system that are associated with the one or more actions.

Further, method 700 may proceed with operation 706, where the data is compared to a plurality of stored policy rules for the data storage system. In one embodiment, a "where" clause within the rule may be compared to data retrieved at the junction to determine if the rule applies to the current junction.

Further still, method 700 may proceed with operation 708, where a policy rule is determined that applies to the data associated with the junction. For example, a match may be determined between the "where" clause of the policy rule and the data associated with the junction.

Also, method 700 may proceed with operation 710, where one or more actions dictated by the policy rule that apply to the data associated with the junction are performed. In one embodiment, an "action" clause of the applicable policy rule may be executed. In another embodiment, the one or more actions may be executed asynchronously or synchronously.

In this way, when a file is opened within a data storage system, the data storage system may know who accessed the file, in what mode the file was accessed, whether it was created, for how long it was open, how many bytes were read/written, who is the owner of the file, what storage tier this file resides on etc. When a file/object is moved between storage tiers or between storage pools within the data storage system, the data storage system may know about the source and the destination of the file/object, who moved it, when it was moved. When a sector in a hard disk becomes unreadable, the data storage system may know about it and may begin data recovery for affected data.

The information governing the above events may have value to components above the storage systems. For example, auditing systems may be informed as to who accessed what files for how long. Cloud storage may bill clients based on how much storage they consume—not just how much storage, but what storage (storage tier) as well, and this information may be provided/reported via the data storage system. Data center administrators may be kept informed, via the data storage system, about any hard disks that have gone bad so they can replace them.

Figure 8:
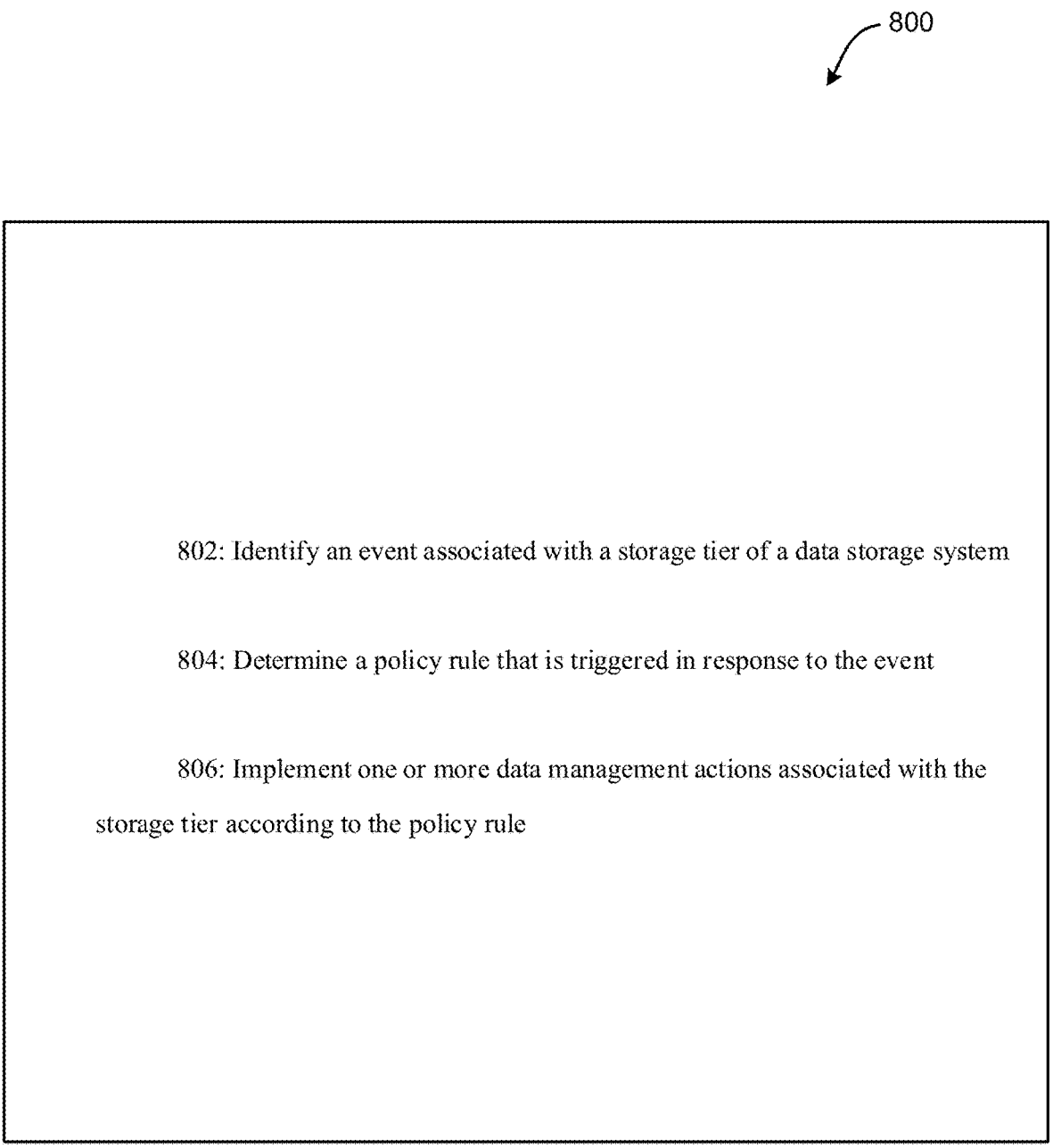
FIG. 8 illustrates a flowchart of a method for dynamically managing a storage tier of a data storage system, in accordance with one embodiment.

Now referring to FIG. 8, a flowchart of a method 800 for dynamically managing a storage tier of a data storage system is shown, according to one embodiment. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where an event associated with a storage tier of a data storage system is identified. In one embodiment, the storage tier may include a type of storage available within the data storage system that allows faster data reading and writing than other storage available within the data storage system. In another embodiment, each file within the data storage system may be assigned to a storage tier within the data storage system. For example, the assigned storage tier for a file may be stored in an inode of the file.

Additionally, in one embodiment, the storage tier may include a burst buffer within the data storage system. For example, the burst buffer may include rapidly accessed persistent memory (e.g., non-volatile random-access memory (NVRAM), etc.) within the data storage system. In another embodiment, the event may include a file event (e.g., a file open event, a file close event, a file delete event, a file create event, etc.) on a file. For example, the file may include a file used to rebuild data after data corruption or an unexpected shutdown. In another example, the file may be identified using metadata, and may be used to rebuild database tables in memory after data loss event.

Further, in one embodiment, the event may include an indication that a storage tier of the data storage system is almost full (e.g., within a predetermined percentage of complete usage, etc.). For example, the event may be identified by determining an available space within the storage tier and comparing the available space to a threshold. If the available space is below a threshold, the storage tier may be determined to be almost full and the event may be initiated.

Further still, in one embodiment, the event may include an indication that a new file is stored (or to be stored) in the storage tier. For example, the event may include receipt of a request to store a file within the storage tier of the data system. In another embodiment, the event may be identified utilizing one or more hooks. For example, a hook may be incorporated into the data storage system, where the hook produces an event when a file moves between storage tiers (e.g., from a low speed storage tier (e.g., a tape drive, a hard disk drive, etc.) to a storage tier, etc.).

Also, method 800 may proceed with operation 804, where a policy rule that is triggered in response to the event is determined. In addition, method 800 may proceed with operation 806, where one or more data management actions associated with the storage tier are implemented, according to the policy rule.

Furthermore, in one embodiment, the one or more actions may include moving data from one storage tier to another storage tier of the data storage system, in response to a file event (e.g., a file open event, a file close event, a file delete event, a file create event, etc.). For example, data may be moved from a burst buffer to a slower storage (hard drive storage, tape storage, etc.). In another embodiment, the moving of the data may be performed in response to the file event on the file. For example, the file may be removed from the storage tier and placed in a lower speed storage tier, in response to the file close event.

Further still, in one embodiment, the one or more actions may include destaging (e.g., moving, etc.) data to another tier within the data storage system (e.g., a lower speed storage tier, etc.). For example, the tier may be indicated within an attribute of the data (e.g., within an inode of a file, etc.). In another embodiment, the destaging may be performed in response to the indication that the storage tier of the data storage system is almost full.

Also, in one embodiment, the assigned storage tier for a file may be stored in the inode of the file. In another embodiment, when the file is opened, the inode may be cached in memory. In yet another embodiment, when the file is closed, the inode may remain cached until it is evicted from memory as a least recently used inode. In still another embodiment, the data storage system may determine the assigned storage tier for a file from the cached inode, which may expedite the destaging process.

Additionally, in one embodiment, the one or more actions may include determining a priority for a file, and managing the file within the storage tier, based on the priority. For example, the managing may be performed in response to an indication that a new file is stored (or to be stored) in the storage tier. In another embodiment, the priority may be determined utilizing metadata for the file (e.g., ownership or access credentials, etc.). In yet another embodiment, each user (e.g., tenant) of the data storage system may be allocated a predetermined amount of space within the storage tier, according to a priority of the user. In still another embodiment, this priority may influence an order in which files are removed (e.g., evicted, etc.) from the storage tier. For example, files with a higher priority may be removed from the storage tier later than files with a lower priority.

Further, in one embodiment, the one or more actions may include logging information for a file. For example, the logging may be performed in response to an indication that a new file is stored (or to be stored) in the storage tier. In another embodiment, the information may be logged to a reserved metadata file written to non-volatile media. In this way, a list of all files stored within the storage tier may be maintained.

Further still, in one embodiment, non-volatile media may be used to reinstate the storage tier after a node failure. For example, the node failure may include a crash of one or more components of the data storage system, corruption within the data storage system, etc. In another example, metadata such as inodes of recently opened files in the storage tier, the LRU list, and LRU counters may be written to non-volatile media. During recovery such a failure, this metadata may be fetched from the non-volatile media and thus, the contents of the high speed tier may be reinstated. In another embodiment, the reserved metadata file may be accessed during run time to determine files that should be cached in memory within the data storage system.

In this way, the data storage system may be tuned to optimize the storage tier. More specifically, predetermined policy rules within the data storage system may be directed toward the storage tier and may enable optimized usage of the storage tier without any knowledge of the actual hardware behind the storage tier.

Now referring to FIG. 9, a flowchart of a method 900 for dynamically managing a file event on a file is shown, according to one embodiment. The method 900 may be performed in accordance with the present invention in any of the environments depicted in FIGS. 1-4, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where a file event on a file is identified within a data storage system, where data associated with the file is stored in a first storage tier of the data storage system. For example, a hook within a control path or data path of the data storage system may detect a request to close a file as a junction within the data storage system. In one embodiment, the file event may include a file open event, a file close event, a file delete event, a file create event, etc.

Additionally, method 900 may proceed with operation 904, where the file event is compared to a plurality of stored policy rules for the data storage system to identify a policy rule that is triggered by the event. Further, method 900 may proceed with operation 906, where the policy rule that is triggered destages the file by moving data associated with the file from the first storage tier of the data storage system to a second storage tier of the data storage system. In this way, more space may be made available within the first storage tier.

Now referring to FIG. 10, a flowchart of a method 1000 for dynamically managing a burst buffer is shown, according to one embodiment. The method 1000 may be performed in accordance with the present invention in any of the environments depicted in FIGS. 1-4, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10, method 1000 may initiate with operation 1002, where an event is identified that indicates that a burst buffer of the data storage system is close to being full. For example, a comparison may be made between a currently available space within the burst buffer and a predetermined threshold, where such comparison may result in an indication that the burst buffer is close to being full. This indication may be detected by a hook within a control path or data path of the data storage system.

Additionally, method 1000 may proceed with operation 1004, where the event is compared to a plurality of stored policy rules for the data storage system to identify a policy rule that is triggered by the event. Further, method 1000 may proceed with operation 1006, where the policy rule that is triggered destages data by moving data within the burst buffer to a low speed storage tier of the data storage system, according to attributes of each file within the burst buffer.

For example, each file within the data storage system may be assigned to a storage tier, and this assignment may be stored as an attribute in the file's inode. Files that are open and being used by a user may have their inodes cached in memory, and when the file is closed, the inode may remain cached until it becomes the least recently used inode and is evicted from memory. This inode caching mechanism may be utilized to find out what storage tier the file current resides in, which may expedite the destaging process because the cached inodes are consulted, instead of an on-disk copy of the inode.

Now referring to FIG. 11, a flowchart of a method 1100 for adding a file to a burst buffer is shown, according to one embodiment. The method 1100 may be performed in accordance with the present invention in any of the environments depicted in FIGS. 1-4, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11, method 1100 may initiate with operation 1102, where an event is identified that indicates that a new file is being brought into a burst buffer of the data storage system. For example, a request may be detected by a hook within a control path or data path of the data storage system, where the request includes a request to transfer the file into the burst buffer from another storage location within the data storage system.

Additionally, method 1100 may proceed with operation 1104, where the event is compared to a plurality of stored policy rules for the data storage system to identify a policy rule that is triggered by the event. Further, method 1100 may proceed with operation 1106, where, according to the policy rule that is triggered, details for the file are determined using ownership or access credentials or other file attributes (e.g., extended attributes, a project name, file naming schemes, etc.), and the details for the file are logged in a reserved metadata file written to non-volatile media.

For example, the details for the file may include a priority that is determined for the file based on the ownership or access credentials for the file. In another example, each tenant that has access to the burst buffer may be allocated space proportional to a priority assigned to that tenant. This priority may be stored within ownership or access credentials for each file associated with a tenant.

Further, in one embodiment, all files with data in node caches or high speed tiers may have their inodes cached in memory. After a node failure, the contents of each high speed tier may need to be restored to what it was before failure. By logging these events in a special reserved metadata file, the file system may maintain a list of all the files that were in the high speed tier/cache before the crash. During recovery, the reserved metadata file may be read and those files reread into the tier. The same non-volatile list may also be consulted at run time to determine what set of files should be cached in memory, rather than assuming all inodes in the high speed tier will fit into memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying an event associated with data stored in a data storage system, utilizing one or more hooks;
    comparing a plurality of policy rules to metadata identified for the event in order to determine a matching policy rule, where the metadata includes an indication of data read, written, and altered during the event; and
    synchronously or asynchronously implementing one or more actions according to the matching policy rule, the one or more actions including enqueueing an event onto an external queue.

2. The computer-implemented method of claim 1, wherein the event includes a junction in a data or control path of the data storage system.

3. The computer-implemented method of claim 1, wherein:
    the matching policy rule is input by a user to the data storage system,
    the event includes a junction in a data path of the data storage system,
    the junction including a performance of one or more predetermined actions on a predetermined file or object within the data storage system,
    identifying the event includes intercepting function calls, messages, and events passed between software components within the data storage system, utilizing the one or more hooks, and analyzing the intercepted function calls, messages, and events to identify the event,
    a plurality of policy rules are reloaded into the data storage system each time a file system is mounted for the data storage system,
    the plurality of policy rules are associated with predetermined subtree of data within the data storage system, and
    the metadata further includes:
        a file name, a path, a file size, an offset, and an inode number of the data,
        a user ID of a user who initiated the event,
        a time of the event, and
        an identification of one or more components of the data storage system.

4. The computer-implemented method of claim 1, wherein the matching policy rule includes a triggering event, and one or more actions to be implemented in response to the triggering event.

5. The computer-implemented method of claim 1, wherein the matching policy rule is persistent.

6. The computer-implemented method of claim 1, wherein the matching policy rule is associated with specific predetermined data within the data storage system.

7. The computer-implemented method of claim 1, wherein the one or more actions include an initiation of an external process.

8. The computer-implemented method of claim 1, wherein the one or more actions include logging the event.

9. The computer-implemented method of claim 1, wherein the metadata further includes:
    a file name, a path, a file size, an offset, and an inode number of the data,
    a user ID of a user who initiated the event,
    a time of the event, and
    an identification of one or more components of the data storage system.

10. The computer-implemented method of claim 1, wherein the one or more actions include intercepting and failing the event.

11. The computer-implemented method of claim 1, wherein:
    the matching policy rule is input by a user to the data storage system,
    the event includes a junction in a data path of the data storage system,
    the junction including a performance of one or more predetermined actions on a predetermined file or object within the data storage system,
    identifying the event includes intercepting function calls, messages, and events passed between software components within the data storage system, utilizing the one or more hooks, and analyzing the intercepted function calls, messages, and events to identify the event,
    a plurality of policy rules are reloaded into the data storage system each time a file system is mounted for the data storage system, and
    the plurality of policy rules are associated with predetermined subtree of data within the data storage system.

12. The computer-implemented method of claim 1, wherein the one or more actions include storing an annotation of the event.

13. The computer-implemented method of claim 1, wherein:
    the event includes a performance of one or more predetermined actions on a predetermined file or object within a data storage system,
    the event is identified by intercepting function calls, messages, and events passed between software components within the data storage system, utilizing the one or more hooks, and analyzing the intercepted function calls, messages, and events to identify the event, and
    the plurality of policy rules are associated with a predetermined subtree of data within the data storage system and are reloaded into the data storage system each time a file system is mounted for the data storage system.

14. The computer-implemented method of claim 1, wherein the event includes a disk failure within a data center associated with the data storage system.

15. The computer-implemented method of claim 1, wherein the event includes a movement of one or more predetermined files between storage tiers of the data storage system.

16. The computer-implemented method of claim 1, wherein:
    the event includes a changing of ownership and access control attributes of a file within the data storage system, and
    the one or more actions further include running one or more internal subroutines within the data storage system that change a state of one or more files within the data storage system.

17. A computer program product for dynamically reacting to events within a data storage system, the computer program product comprising a computer readable storage medium having program instructions embodied therewith, wherein the computer readable storage medium is not a transitory signal per se, the program instructions executable by a processor to cause the processor to perform a method comprising:

identifying, by the processor, an event associated with data stored in the data storage system, utilizing one or more hooks;

comparing a plurality of policy rules to metadata identified for the event in order to determine a matching policy rule, utilizing the processor, where the metadata includes an indication of data read, written, and altered during the event; and synchronously or asynchronously implementing one or more actions according to the matching policy rule, utilizing the processor, the one or more actions including enqueueing an event onto an external queue.

18. The computer program product of claim 17, wherein the event includes a junction in a data or control path of the data storage system.

19. The computer program product of claim 17, wherein the one or more actions include running one or more internal subroutines within the data storage system that change a state of one or more files within the data storage system.

20. A system, comprising:
a processor; and
logic integrated with the processor, executable by the processor, or integrated with and executable by the processor, the logic being configured to:
identify an event associated with data stored in a data storage system, utilizing one or more hooks;
comparing a plurality of policy rules to metadata identified for the event in order to determine a matching policy rule, where the metadata includes an indication of data read, written, and altered during the event; and
synchronously or asynchronously implement one or more actions according to the matching policy rule, the one or more actions including enqueueing an event onto an external queue.

21. A computer-implemented method, comprising:
identifying an event including a performance of one or more predetermined actions on a predetermined file or object within a data storage system by intercepting function calls, messages, and events passed between software components within the data storage system, utilizing one or more hooks, and analyzing the intercepted function calls, messages, and events to identify the event;
comparing a plurality of policy rules to metadata identified for the event in order to determine a matching policy rule, where the plurality of policy rules are associated with a predetermined subtree of data within the data storage system and are reloaded into the data storage system each time a file system is mounted for the data storage system, where the metadata includes:
a file name, a path, a file size, an offset, and an inode number of the data,
a user ID of a user who initiated the event,
a time of the event,
an identification of one or more components of the data storage system, and
an indication of data read, written, and altered during the event; and
synchronously or asynchronously implementing one or more actions according to the policy rule, including enqueueing an event onto an external queue.

22. A computer-implemented method, comprising:
identifying an event associated with data stored in a data storage system, utilizing one or more hooks;
comparing a plurality of policy rules to metadata identified for the event in order to determine a matching policy rule, where the metadata includes:
a file name, a path, a file size, an offset, and an inode number of the data,
a user ID of a user who initiated the event,
a time of the event,
an identification of one or more components of the data storage system, and
an indication of data read, written, and altered during the event; and
synchronously or asynchronously implementing one or more actions according to the policy rule, including enqueueing an event onto an external queue.

* * * * *